United States Patent [19]
Blanchard

[11] 4,323,354
[45] Apr. 6, 1982

[54] TWO-SPEED AUTOMATIC TRANSMISSION FOR A MARINE PROPULSION DEVICE

[75] Inventor: Clarence E. Blanchard, Kenosha, Wis.

[73] Assignee: Outboard Marine Corporation, Waukegan, Ill.

[21] Appl. No.: 12,385

[22] Filed: Feb. 15, 1979

[51] Int. Cl.³ ............................................. B63H 1/14
[52] U.S. Cl. .................................. 440/75; 74/336 R
[58] Field of Search .................... 115/17, 18 R, 34 R, 115/35; 74/322, 335, 336 R, 336 S, 333.7; 192/48.3; 440/75, 900, 84

[56] References Cited

U.S. PATENT DOCUMENTS

| | | | |
|---|---|---|---|
| 1,979,077 | 10/1934 | Pilaar | 74/336 |
| 2,170,926 | 8/1939 | Keller | 74/336 |
| 2,219,812 | 8/1940 | Hochstetter | 74/336 |
| 3,148,557 | 9/1964 | Shimanckas | 115/18 |
| 3,372,601 | 3/1968 | Orcutt et al. | 74/336 |
| 3,532,068 | 8/1968 | Lamburn | 115/34 R |

Primary Examiner—Trygve M. Blix
Assistant Examiner—Jesus D. Sotelo
Attorney, Agent, or Firm—Michael, Best & Friedrich

[57] ABSTRACT

Disclosed herein is a marine propulsion device including an input shaft drivingly connected to a power source, a lower unit having a rotatably mounted drive shaft extending in coaxial relation to the input shaft, and a propeller shaft rotatably mounted in the lower unit, the propeller shaft carrying a propeller. A two-speed transmission is provided to drivingly connect the input shaft to the drive shaft, the transmission including a first drive arrangement between the input shaft and the drive shaft for selectively drivingly connecting the input shaft and the drive shaft, the first drive arrangement including a third shaft rotatably mounted in parrallel relation to the input shaft and the drive shaft, a drive gear, a driven gear mounted on the third shaft and in meshing engagement with the drive gear, and a one-way overrunning clutch drivingly connecting the input shaft and the drive shaft through the drive and driven gears when the rotational speed of the input shaft is less than a predetermined value. The first drive arrangement has an input-output speed ratio with a first value. The transmission also includes a second drive arrangement for selectively drivingly connecting the input shaft and the drive shaft when the rotational speed of the input shaft is greater than the predetermined value, the second drive arrangement including a selectively actuatable clutch for drivingly connecting the input shaft and the drive shaft. The second drive arrangement has an input-output speed ratio with a second value greater than the first value.

55 Claims, 18 Drawing Figures

TWO-SPEED AUTOMATIC TRANSMISSION FOR A MARINE PROPULSION DEVICE

BACKGROUND OF THE INVENTION

The invention relates to transmissions and, more particularly, to two-speed automatic transmissions for marine propulsion devices and the like.

The thrust requirement curve (thrust vs. speed) for planing boats propelled by an outboard motor or propulsion unit has a marked hump at the point where the boat is starting to plane. The propeller ordinarily must absorb full engine power at rated engine r.p.m. and maximum boat speed. A propeller of conventional size normally limits the r.p.m. during this critical time, thereby limiting the thrust developed. If the propeller is designed to permit the boat to "go over the hump" under relatively high load conditions, such as when water skiers are being towed, once the boat is planing and less power is required to drive the propeller, the propeller will not provide sufficient restraint and will permit the engine to run at excessive speeds.

This problem could be alleviated by using a propeller having an adjustable pitch; however, many years of development have failed to produce a practical and efficient adjustable pitch propeller.

Also, it is desirable for propulsion units used in racing boats to have a transmission which permits the boat engine to rapidly turn up to full speed when accelerating out of a turn and then shift automatically to facilitate full speed operation after the boat is planing.

For an illustration of a related transmission for a marine propulsion unit, attenuation is directed to the U.S. Strang patent application Ser. No. 880,038, filed Feb. 22, 1978 and assigned to the assignee of the present invention.

Attention is also directed to the Molly U.S. Pat. No. 1,795,135 and to the Hochstetter U.S. Pat. No. 2,219,812 for illustrations of prior art transmission means.

Attention is further directed to the Long U.S. Pat. Nos. 2,638,862; 2,688,298; and 2,751,799 and to the U.S. Avramidis et al. U.S. Pat. No. 3,884,097.

SUMMARY OF THE INVENTION

The invention provides a two-speed transmission which is particularly adaptable for a marine propulsion device, such as an outboard motor or a stern drive unit, and which is shiftable from a first gear ratio, permitting the engine to operate at a high speed while driving a propeller at a low speed, to a second gear ratio, permitting the propeller to be driven at a higher speed without increasing the speed of the engine.

More specifically, the invention provides a marine propulsion device including an input shaft drivingly connected to a power source, a lower unit having a rotatably mounted drive shaft extending in coaxial relation to the input shaft. The marine propulsion device also includes a propeller shaft rotatably mounted in the lower unit and carrying a propeller, means drivingly connecting the drive shaft to the propeller shaft, and a two-speed transmission drivingly connecting the input shaft to the drive shaft. The transmission includes first drive means between the input shaft and the drive shaft for selectively drivingly connecting the input shaft and the drive shaft at all input speeds. The first drive means includes a first drive gear mounted on the input shaft, a third shaft rotatably mounted in parallel relation to the input shaft and the drive shaft, a first driven gear mounted on the third shaft and in meshing engagement with the drive gear, a second drive gear mounted on the third shaft, and a second driven gear mounted on the drive shaft and in meshing engagement with the second drive gear. The transmission first drive means further includes a one-way overrunning clutch drivingly connecting one of the shafts to a gear mounted on that shaft when the rotational speed of the input shaft is less than a predetermined value. The transmission also includes a second drive means for selectively drivingly connecting the input shaft and the drive shaft when the rotational speed of the input shaft is greater than the predetermined value, the second drive means including a selectively actuatable clutch for drivingly connecting the input shaft and the drive shaft, and the second drive means having an input-output speed ratio with a value greater than the input-output speed ratio of the first drive means.

The invention also provides a marine propulsion device including a rotatably mounted input shaft drivingly connected to a power source, a lower unit having a rotatably mounted drive shaft extending in coaxial relation to the input shaft, a propeller shaft rotatably mounted in the lower unit and carrying a propeller, and means drivingly connecting the drive shaft to the propeller shaft. The marine propulsion device also includes a two speed transmission drivingly connecting the input shaft to the drive shaft, the two speed transmission including a third shaft rotatably mounted in parallel relation to the input shaft and the drive shaft, first drive and driven gears in meshing engagement, second drive and driven gears in meshing engagement, and means fixedly connecting three of the first drive gear to the input shaft, the first driven gear to the third shaft, the third shaft to the second drive gear, and the second driven gear to the drive shaft. The transmission also includes a one-way overrunning clutch connecting the other of the first drive gear to the input shaft, the first driven gear to the third shaft, the third shaft to the second drive gear, and the second driven gear to the drive shaft, and a clutch for selectively drivingly connecting the input shaft and the drive shaft.

The invention also provides a marine propulsion device having a rotatably mounted input shaft drivingly connected to a power source, a lower unit having a rotatably mounted drive shaft extending in coaxial relation to the input shaft, a propeller shaft rotatably mounted in the lower unit and carrying a propeller, and means drivingly connecting the drive shaft to the propeller shaft. The marine propulsion device also includes a two-speed transmission drivingly connecting the input shaft to the drive shaft, the transmission including a third shaft rotatably mounted in parallel relation to the input shaft and the drive shaft, first drive and driven gears in meshing engagement, second drive and driven gears in meshing engagement, means fixedly connecting one of the first drive gear to the input shaft and the first driven gear to the third shaft, and a one-way overrunning clutch connecting the other of the first drive gear to the input shaft and the first driven gear to the third shaft. The transmission also includes means fixedly connecting the second drive gear to the third shaft, and means fixedly connecting the second driven gear to the drive shaft. The transmission further includes a clutch for selectively drivingly connecting the input shaft and the drive shaft.

The invention further provides a marine propulsion device having a rotatably mounted input shaft drivingly connected to a power source, a lower unit having a rotatably mounted drive shaft extending in coaxial relation to the input shaft, a propeller shaft rotatably mounted in the lower unit and carrying a propeller, and means drivingly connecting the drive shaft to the propeller shaft. The marine propulsion device also includes a two-speed transmission drivingly connecting the input shaft to the drive shaft, the transmission including a third shaft rotatably mounted in parallel relation to the input shaft and the drive shaft, first drive and driven gears in meshing engagement, second drive and driven gears in meshing engagement, and means fixedly connecting the first drive gear to the input shaft and the first driven gear to the third shaft. The transmission also includes means fixedly connecting one of the second driven gear to the drive shaft and the second drive gear to the third shaft, a one-way overrunning clutch connecting the other of said second driven gear to the drive shaft, the second drive gear to the third shaft, and a clutch for selectively drivingly connecting the input shaft and the drive shaft.

The invention additionally provides a marine propulsion device comprising a rotatably mounted input shaft drivingly connected to a power source, a lower unit having a rotatably mounted first drive shaft extending in coaxial relation to the input shaft and a second drive shaft rotatably mounted in parallel relation to the input shaft and the drive shaft, a propeller shaft rotatably mounted in the lower unit and carrying a propeller, means drivingly connecting the first and second drive shafts to the propeller shaft, and a two-speed transmission drivingly connecting the input shaft to the first and second drive shafts. The transmission includes first drive and driven gears in meshing engagement, second drive and driven gears in meshing engagement, means fixedly connecting one of the first drive gear to the input shaft and the first driven gear to the second drive shaft, and a one-way overrunning clutch connecting the other of the first drive gear to the input shaft and the first driven gear to the second drive shaft. The transmission also includes means fixedly connecting the second drive gear in the second drive shaft, means fixedly connecting the second driven gear to the first drive shaft, and a clutch for selectively drivingly connecting the input shaft and the drive shaft.

The invention further provides a marine propulsion device having a rotatably mounted input shaft drivingly connected to a power source, a lower unit having a first rotatably mounted drive shaft extending in coaxial relation to the input shaft and a second rotatably mounted drive shaft parallel to the first drive shaft. The marine propulsion device also includes a propeller shaft rotatably mounted in the lower unit and carrying a propeller, and means drivingly connecting the first and second drive shafts to the propeller shaft. The marine propulsion device further includes a two-speed transmission drivingly connecting the input shaft to the first and second drive shafts. The transmission includes a third shaft rotatably mounted in parallel relation to the input shaft, first drive and driven gears in meshing engagement, second drive and driven gears in meshing engagement, and a third gear fixed for rotation with the second drive shaft and disposed in meshing engagement with the second driven gear. The transmission also includes means fixedly connecting three of the first drive gear to the input shaft, the first driven gear to the third shaft, the second driven gear to the first drive shaft, and the second drive gear to the third shaft, a one-way overrunning clutch connecting the other of the first drive gear to the input shaft, the first driven gear to the third shaft, the second drive gear to the third shaft, and the second driven gear to said first drive shaft. Finally, the transmission incudes a clutch for selectively drivingly connecting the input shaft and the first drive shaft.

The invention also provides a marine propulsion device having a rotatably mounted input shaft drivingly connected to a power source, a lower unit having a first rotatably mounted drive shaft extending in coaxial relation to the input shaft, and a second rotatably mounted drive shaft parallel to the first drive shaft. The marine propulsion device further includes a propeller shaft rotatably mounted in the lower unit and carrying a propeller, means drivingly connecting the first and second drive shafts to the propeller shaft, and a two-speed transmission drivingly connecting the input shaft to the first and second drive shafts. The transmission includes a third shaft rotatably mounted in parallel relation to the input shaft, first drive and driven gears in meshing engagement, second drive and driven gears in meshing engagement, means fixedly connecting the first drive gear to the input shaft and the first driven gear to the third shaft, and means fixedly connecting one of the second driven gear to the first drive shaft and the second drive gear to the third shaft. The transmission also includes a one-way overrunning clutch connecting the other of the second driven gear to the first drive shaft and the second drive gear to the third shaft, and a clutch for selectively drivingly connecting the input shaft and the first drive shaft. Finally, the transmission includes third drive and driven gears in meshing engagement, and means fixedly connecting the third drive gear to the first drive shaft and the third driven gear to the drive shaft.

One of the principal features of the invention is the provision in the transmission of a selectively actuatable clutch which comprises a centrifugal clutch including a drum supported for rotation with one of the input shaft and the drive shaft, a driver supported for rotation with the other of the input shaft and the drive shaft, and at least one clutch shoe moveably mounted on the driver for movement into engagement with the drum.

Other features and advantages of the invention will become apparent by reference to the following description, to the claims and to the drawings.

Before explaining preferred embodiments of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENTS

Figure 1:
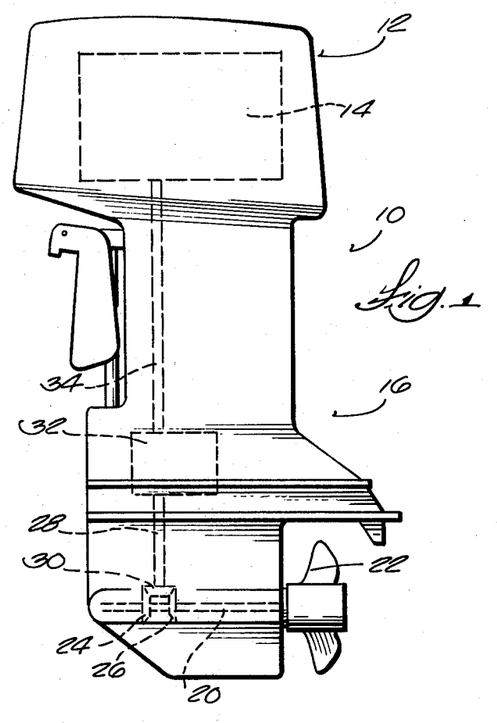
FIG. 1 is a side elevation view, partially broken away, of an outboard motor embodying various features of the invention.

Illustrated in FIG. 1 is a marine propulsion device, such as an outboard motor 10, including a power head 12 which houses an internal combustion engine 14, and a lower unit 16. Rotatably mounted in the lower unit 16 is a propeller shaft 20 carrying, at its outer end, a propeller 22. Also located within the lower unit 16 is a pair of facing, axially-spaced gears 24 and 26 which are carried by and drivingly connected to the propeller shaft 20. Extending through the lower unit 16 is a rotatably mounted drive shaft 28 carrying a lower bevel gear 30 which meshes with the gears 24 and 26. The drive shaft 28 is drivingly connected to the engine 14 through a two-speed transmission, designated generally by the reference numeral 32.

Figure 2:
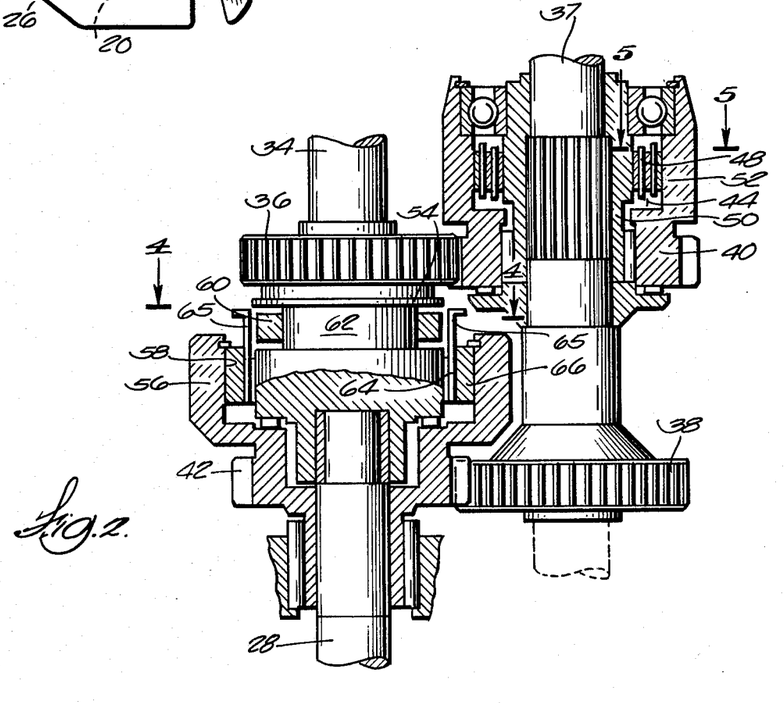
FIG. 2 is an enlarged cross section view of a transmission embodied in the outboard motor illustrated in FIG. 1.

The transmission 32, shown in greater detail in FIG. 2, includes a rotatably mounted input shaft 34 drivingly connected to the engine 14 and coaxial with the drive shaft 38, and a first drive gear 36 carried by and mounted for common rotation with the input shaft 34. The transmission 32 also includes a first driven gear 40 which meshes with the first drive gear 36 and which is mounted for rotation on a third shaft 37 parallel to the input shaft 34 and the drive shaft 28. A second drive gear 38 is carried by and mounted for common rotation with the third shaft 37, and a second driven gear 42 which meshes with the second drive gear 38 is mounted in splined relation on the drive shaft 28 for common rotation with the drive shaft. While in the illustrated construction, the gear ratio between the first drive gear 36 and the first driven gear 40 is less than one-to-one, and the gear ratio between the second drive gear 38 and the second driven gear 42 is one-to-one, in alternative embodiments, other suitable speed reduction gear ratios can be employed.

The first driven gear 40 is drivingly connected to the third shaft 37 by a suitable one-way overrunning clutch means 44 disposed therebetween. The one-way clutch means 44 is constructed in a conventional manner, and a detailed description of its structural features and mode of operation is not necessary for full understanding of the invention. Generally, the one-way clutch means 44 is arranged so that, in response to rotation of the first driven gear 40 via the first drive gear 36 and the input shaft 34, it drives the third shaft 37 in one rotary direction. Further, the one-way clutch means 44 is arranged so that, when the rotational speed of the third shaft 37 in the one rotary direction exceeds the rotational speed of the first driven gear 40 in the same rotary direction, i.e., when the third shaft 37 overruns the first driven gear 40, the third shaft 37 becomes free wheeling relative to the first driven gear 40. While the construction of the one-way overrunning clutch means 44 will not be described in detail, generally the one-way clutch means 44 includes wedges 46 which are supported by a race assembly 48 between the outer surface of a sleeve 50 mounted on the third shaft 37 for rotation with the third shaft 37 and an internal surface of a drum portion 52 of the gear 40. When the drum portion 52 of the gear 40 rotates in one rotational direction with respect to the sleeve 50 and the third shaft 37, the wedges 46 are wedged therebetween and the first driven gear 40 drives the third shaft 37. However, if the shaft 37 is driven faster than the first driven gear 40, the wedges 46 will not prevent the shaft 37 from overrunning the gear 40.

Carried on the input shaft 34 is a centrifugal clutch means which is operable, in response to rotation of the input shaft 34 above a predetermined speed of the shaft 34, to drivingly connect the second driven gear 42 and the drive shaft 28 to the input shaft 34 for rotation with the input shaft. While various arrangements can be used, in the specific construction illustrated, there is provided a centrifugal clutch 54 including a clutch drum 56 which has a cylindrical inner surface 58 and is mounted for common rotation with the second driven gear 42 and the drive shaft 28. While the clutch drum 56 is shown as being carried by the second driven gear 42, it should be understood that it could also be carried by the drive shaft. The centrifugal clutch 54 also has two or more clutch weights 60 carried by a clutch shoe driver 62 which is mounted for rotation with the first drive gear 36 and the input shaft 34. While the driver 62 is shown as being carried by the first drive gear 36, it could also be carried by the input shaft 34. The clutch weights are releasably restrained in a radially inward position by suitable springs (not shown). The clutch shoe driver 62 rotates the clutch weights 60, in response to rotation of the input shaft 34, and is arranged in a suitable manner to cause the clutch weights 60 to move radially between an inner or retracted position spaced inwardly from a sprag cage 64 and an outer or extended position wherein the weights 60 engage an upper portion 65 of the sprag cage 64 wherein the sprag cage 64 causes cocking or pivoting of the sprags 66 of a sprag clutch whereby the sprags 66 will provide driving engagement between the driver 62 and the clutch drum 56 thereby providing a driving connection between the input shaft 34 and the drive shaft 28.

In operation, when the input shaft 34 is being rotated at low or moderate speeds, the drive shaft 28, and thus the propeller 22, is driven by the input shaft 34 via the first drive gear 36, the first driven gear 40, and the one-way overrunning clutch means 44, through the second drive gear 38 and the second driven gear 42. The second driven gear 42, being driven by the second drive gear 38, is free wheeling relative to the input shaft 34 because the clutch shoe driver 62 is being rotated at a speed less then the predetermined speed at which the clutch weights 60 are moved radially outwardly to the extended position.

When the engine speed is increased to a point where the input shaft 34 and the clutch shoe driver 62 are rotated above the predetermined speed, the clutch weights 60 drivingly engage the sprag cage 64 to cause driving engagement between the input shaft 34 and the drive shaft. When the engine operates at this increased speed, the gears 42 and 38 will drive the third shaft 37 at a rate faster than the rate of rotation of the first driven gear 40, the one-way clutch means 44 permitting the third shaft 37 to be free wheeling relative to the first driven gear 40.

When the engine speed is decreased to a point where the rate of rotation of the driver 62 falls below the predetermined speed, the springs acting on the clutch weights 60 cause the clutch weights to return toward the retracted position, thereby disconnecting the second driven gear 42 and the drive shaft 28 from the input shaft 34 and causing a reduction in the rate of rotation of the drive shaft 28 and the third shaft 37 to a speed where the one-way clutch means 44 re-engages. The third shaft and the drive shaft 28 are thereafter driven by the input shaft 34 via the first drive gear 36, the first driven gear 40, and the one-way clutch means 44.

With this arrangement, and due to the provision of speed reduction gears between the input shaft and the drive shaft, and wherein the speed reduction gears are operable at lower input shaft speeds, a relatively large propeller can be used to develop sufficient thrust to get the boat to "go over the hump" on the thrust vs. speed curve with large boat loads or while towing skiers and yet the engine will not overspeed at full throttle and maximum boat speed after the boat is planing. That is, the engine 14 can be operated at a high speed while rotating the propeller 22 at a relatively low speed via the input shaft 34, the first drive gear 36, the first driven gear 40, and the one-way clutch means 44, to develop sufficient power or thrust to get the boat "over the hump". Once the boat is planing and less engine power is required to rotate the propeller 22 at maximum speed, the transmission 32 shifts from reduction gearing, via the centrifugal clutch 54, to a one-to-one drive ratio thereby preventing the engine 14 from overspeeding at full throttle and maximum boat speed. Furthermore, smaller, more economical engines can be used for carrying heavy loads or towing water skiers, which tasks normally require larger engines to get the boat "over the hump" and into planing trim.

Further, the two-speed transmission 32 can be advantageously used in propulsion units for racing boats. The transmission permits the engine to deliver high torque to the propeller at lower engine speeds and to rapidly turn up to higher r.p.m.'s while accelerating out of a turn, and then shifts, after the boat is planing, to facilitate top speed operation. When a centrifugal clutch is employed as in the embodiment illustrated in FIG. 1, this shifting is accomplished automatically without any effort on the part of the driver, and higher lap speeds can be obtained for a given engine.

Additionally, the transmission is sufficiently compact that it can be included in the lower unit of an outboard motor. In order to limit the drag on the outboard motor, it is desirable that the lower unit be as thin and compact as possible. Accordingly, the use of a compact transmission is highly desireable.

FIGS. 3 through 9 illustrate other embodiments of the transmission shown in FIG. 2 and include various components which are constructed and arranged in a manner similar to the embodiment illustrated in FIGS. 1 and 2. Thus, the same reference numerals have been assigned to common components.

Figures 3, 4, 5, 6, 7:
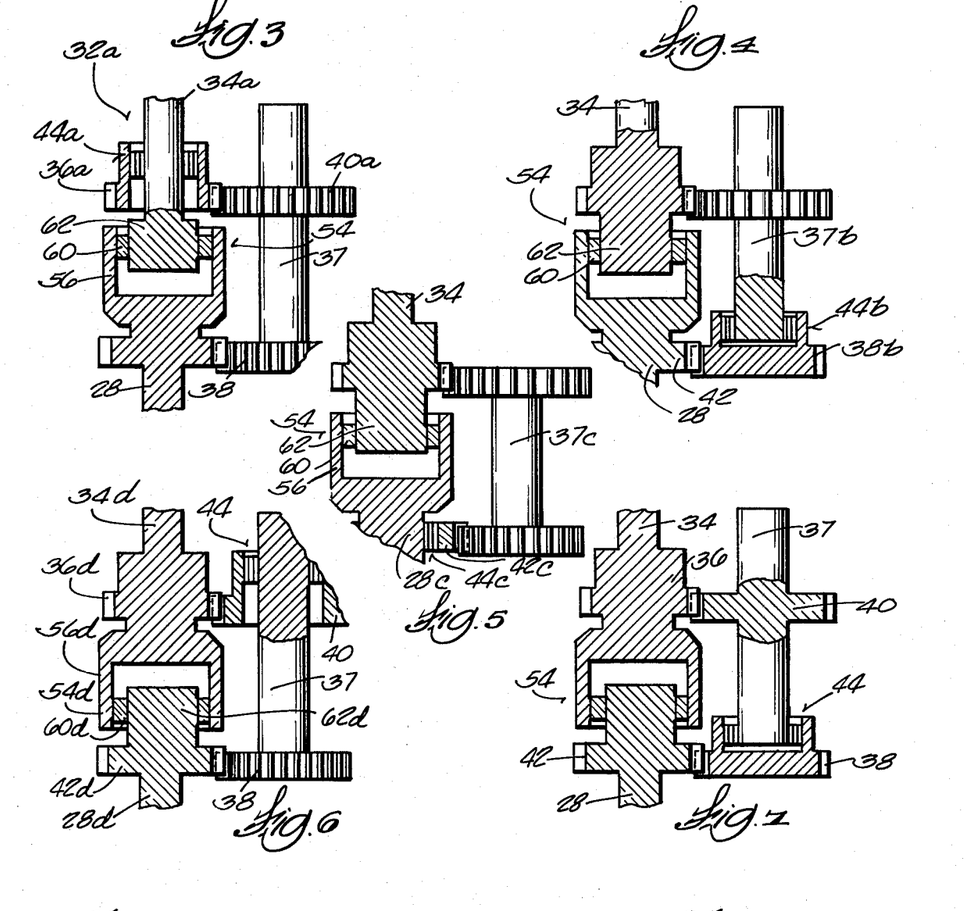
FIGS. 3–9 are cross sectional views of alternative embodiments of the transmission illustrated in FIG. 2.

The basic difference between the transmission 32a shown in FIG. 3 and the transmission 32 shown in FIG. 2 is that the former employs an overrunning clutch 44a disposed between the first drive gear 36a and the input shaft 34a, the driver 62 being carried by the input shaft 34a, and the first driven gear 40a is fixedly mounted on the third shaft 37. The overrunning clutch 44a functions to provide a driving connection between the input shaft 34a and the first drive gear 36a to thereby permit the input shaft 34a to drive the first gear 36a, but if the drive gear 36a is driven at a speed greater than the speed of the input shaft 34a, the gear 36a is free to overrun the shaft 34a.

In operation, when the input shaft 34a is being driven at low or moderate speeds, the drive shaft 28 is driven by the input shaft 34a via the overrunning clutch means 44a and the first driven gear 40a and through the third shaft 37, the second drive gear 38 and the second driven gear 42. The second driven gear 42 is free wheeling relative to the clutch shoe driver 62 and the input shaft 34a because the driver 62 is being rotated at a speed less than the predetermined speed at which the clutch weights 60 move radially outwardly to engage the drum 56. When the engine speed and the speed of the driver 62 are increased sufficiently to cause driving engagement between the input shaft 34a and the drive shaft 28 through the centrifugal clutch 54, the rate of rotation of the gears 42 and 38 and the third shaft 37 is increased. The first drive gear 36a will then be driven by the gear 40a at a rotational speed faster than that of the input shaft 34a, the one-way overrunning clutch 44a permitting the gear 36a to overrun the shaft 34a.

The two-speed automatic transmission illustrated in FIG. 4 is similar to the embodiments illustrated in FIGS. 2 and 3, but the overrunning clutch 44b is relocated so as to be positioned between the second drive gear 38b and the third shaft 37b. In operation, at the low engine speeds, the one-way overrunning clutch 44b permits power to be transmitted from the third shaft 37b to the second drive gear 38b whereby the second drive gear 38b can drive the second driven gear 42 and the drive shaft 28. When the engine speed and the speed of the driver 62 is increased sufficiently to cause driving engagement between the input shaft 34 and the drive shaft 28 through the centrifugal clutch 54, the rate of rotation of the drive shaft 28 and the gear 42 will be increased. The one-way overrunning clutch 44b permits the gear 38b to be driven by gear 42 at the increased speed and to overrun the third shaft 37b.

The two-speed automatic transmission illustrated in FIG. 5 is again similar to the embodiments illustrated in FIGS. 2 through 4, but the overrunning clutch 44c is relocated so as to be positioned between the second driven gear 42c and the drive shaft 28c, and the drum 56 of the centrifugal clutch 54 is carried by the drive shaft 28c. In operation, at the low engine speeds, the overrunning clutch 44c provides a one-way driving connection between the second driven gear 42c and the drive shaft 28c. However, when the speed of the engine 14 and the input shaft 34 are increased sufficiently that the drive shaft 28c is driven by the input shaft 34 through the centrifugal clutch 54, the overrunning clutch 44c permits the drive shaft 28c to overrun the second driven gear 42c.

The two-speed automatic transmission illustrated in FIG. 6 is similar to the embodiment illustrated in FIG. 2 except that the centrifugal clutch 54d, which functions to selectively drivingly connect the input shaft 34d and the drive shaft 28d, includes a driver 62d which is integrally attached to the drive shaft 28d and which supports weights 60d. Furthermore, the centrifugal clutch drum 56d is integrally joined to the drive shaft 34d and the first drive gear 36d for rotation therewith.

The operation of the two-speed transmission illustrated in FIG. 6 is similar to that of FIG. 2. When the input shaft 34d is being driven at low or moderate speeds, the drive shaft 28d is driven by the input shaft 34d via the first drive gear 36d and the first driven gear 40, and the third shaft 37 is driven through the one-way overrunning clutch 44. The third shaft 37 further drives the second drive gear 38 and the second driven gear 42d to thereby drive the drive shaft 28d. When the engine speed and the speed of the input shaft 34d are increased, the speed of the drive shaft 28d and the driver 62d will be driven by gears 36d, 40, 38 and 42d at a rotational speed sufficient to cause the weights 60d to engage the drum 56d and to thereby cause a driving connection through the centrifugal clutch 54d between the input shaft 34d and the drive shaft 28d.

Figure 8:
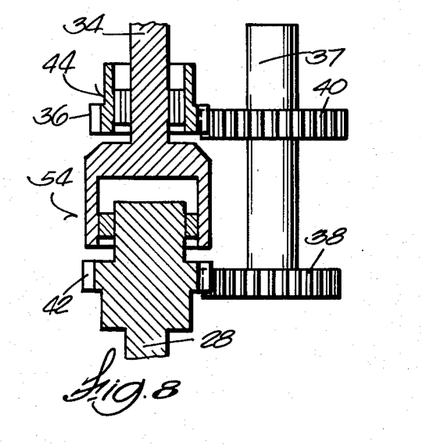
Figure 9:
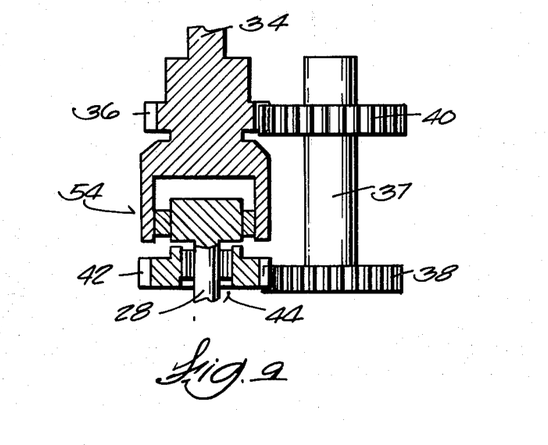

FIGS. 7 through 9 illustrate additional alternative embodiments of the two-speed transmission similar to the embodiment shown in FIG. 6 but wherein the overrunning clutch 44 is disposed in the alternative positions as specified in connection with FIGS. 3 through 5, respectively.

Figure 10:
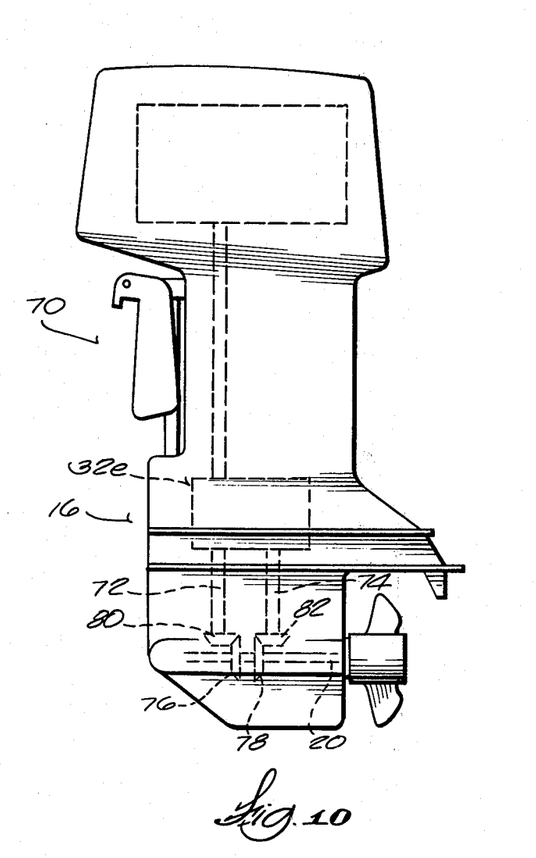
FIG. 10 is a side elevational view partially broken away, of another embodiment of an outboard motor embodying various features of the invention.

FIG. 10 illustrates another alternative embodiment of the invention including components which are constructed and arranged in a manner similar to the embodiment illustrated in FIG. 1. The same reference numerals have been assigned to common components. The basic difference between the marine propulsion unit 70 shown in FIG. 10 and the marine propulsion unit 10 shown in FIG. 1 is that the former employs dual drive shafts 72 and 74 instead of a single drive shaft 28. The use of dual drive shafts 72 and 74 affords the use of smaller drive gears to impart the same power to the propeller and thus affords less frontal area of the lower unit 16 and/or smaller size of that portion of the housing enclosing the upper ends of the drive shafts.

Located within the lower unit 16 and drivingly connected to the propeller shaft 20 are a pair of bevel gears 76 and 78 which can be a unitary element or separate gears as illustrated. The first rotatably mounted drive shaft 72 carries a lower beveled gear 80 which meshes with the gear 76. Extending through the lower unit 16 in parallel relationship to the first drive shaft 72 is a second rotatably mounted drive shaft 76 carrying a lower bevel gear 82 which meshes with the other of the gears 78. The first and second drive shafts 72 and 74 are drivingly connected to the engine by a two-speed transmission 32e which is constructed and operates in the same basic manner as the transmission 32 in FIG. 1, except that the two-speed transmission 32e further includes means for driving the second drive shaft 74.

Figure 11:
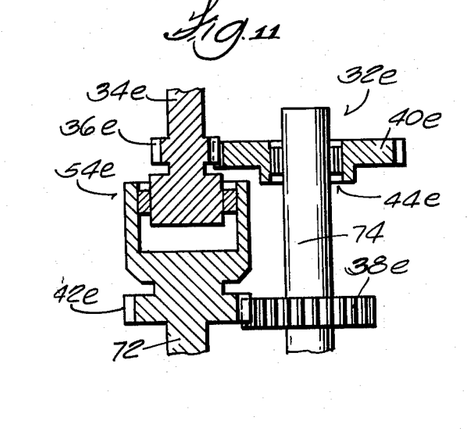
FIG. 11 is an enlarged cross sectional view of a transmission embodied in the outboard motor illustrated in FIG. 10.

The transmission 32e, shown in greater detail in FIG. 11, is similar to the transmission shown in FIG. 2 except that in the former the third shaft 37 is replaced by the second drive shaft 74. The components of the embodiment of the transmission shown in FIG. 11 are otherwise arranged and constructed in a manner similar to the embodiment illustrated in FIG. 2. Thus, the same reference numerals have been assigned to common components.

In operation, when the input shaft 34e is being rotated at low or moderate speeds, the second drive shaft 74 is driven through speed reduction gearing comprised of the first drive gear 36e and the first driven gear 40e. The first driven gear drives the second drive shaft 74 through a one-way overrunning clutch means 44e. The second drive shaft 74 will in turn drive the first drive shaft 72 through second drive gear 38e and second driven gear 42e. The gears 38e and 42e provide a one-to-one drive ratio so that the first drive shaft 72 is driven at the same speed as the second drive shaft 74. When the rotational speed of the input shaft 34e exceeds a predetermined value, the centrifugal clutch 54e will function to provide a driving connection between the input shaft 34e and the first drive shaft 72. The first drive shaft 72 will, in turn, drive the second drive shaft 74 via the second driven gear 42e and the second drive gear 38e at a rotational speed greater than the rotational speed of the first driven gear 40e. The one-way overrunning clutch means 44e between the second drive shaft 74 and the first driven gear 40e permits the second drive shaft 74 to overrun the first driven gear 40e.

Figure 12:
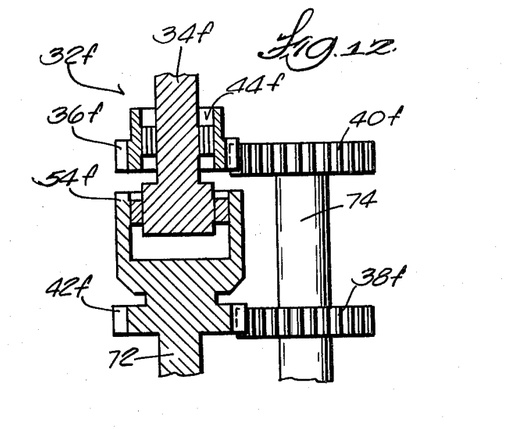
FIGS. 12–18 are views similar to FIG. 11 and illustrating alternative embodiments of the transmission illustrated in FIG. 11.

An alternative embodiment of the transmission shown in FIG. 11 is shown in FIG. 12. The two speed automatic transmission 32f, shown in FIG. 12, is similar to that shown in FIG. 11 except that the former employs an overrunning clutch 44f between the first drive gear 36f and the input shaft 34f, and the first driven gear 40f is fixedly mounted on the second drive shaft 74. In operation, the overrunning clutch 44f provides a driving connection between the input shaft 34f and the first drive gear 36f when the input shaft 34f rotates at a speed less than a predetermined speed, and the first drive gear 36f drives the first driven gear 40f and the first and second drive shafts 72 and 74. When the speed of the input shaft 34f reaches a predetermined speed, the centrifugal clutch 54f provides a driving connection between the input shaft 34f and the first drive shaft 72. The second driven gear 42f, in turn, drives the second drive gear 38f and the second drive shaft 74. The one-way overrunning clutch 44f permits the first drive gear 36f to be driven by the first driven gear 40f at a speed exceeding that of the input shaft 34f.

Figure 13:
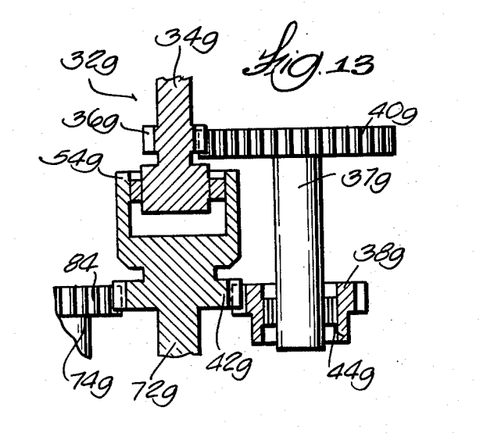

Another alternative embodiment of the transmission shown in FIGS. 11 and 12 is illustrated in FIG. 13. The transmission 32g shown therein is similar in structure and operation to that shown in FIG. 4 but further includes a third driven gear 84 fixedly mounted on the second drive shaft 74g and meshing with the second driven gear 42g. In operation of the transmission 32g at low engine speeds, a one-way overrunning clutch 44g permits power to be transmitted from the input shaft 34g through the reduction gear ratio provided by the first drive gear 36g, and the first driven gear 40g, and through the third shaft 37g to the second drive gear 38g. The second drive gear 38g then transmits power to the second driven gear 42g and the third driven gear 84 to thereby drive the drive shafts 72g and 74g. When the engine speed exceeds the predetermined value, the centrifugal clutch 54g provides driving engagement between the input shaft 34g and the first drive shaft 72g. The second driven gear 42g drives the third driven gear 84 and the second drive shaft 74g. The one-way overrunning clutch 44g permits the second drive gear 38g to overrun the third shaft 37g.

Figure 14:
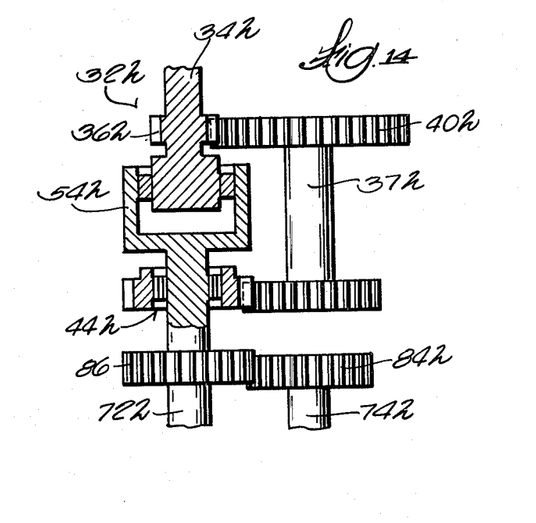

An additional alternative embodiment of the transmission embodying the invention is illustrated in FIG. 14, the transmission 32h shown therein being similar in structure and operation to that shown in FIG. 5 but further including a third drive gear 86 fixedly mounted on the first drive shaft 72h and meshing with a complementary third gear 84h fixedly mounted on the second drive shaft 74h, the third drive and driven gears 86 and 84h providing for rotation of the second drive shaft 74h with the first drive shaft 72h.

Figure 15:
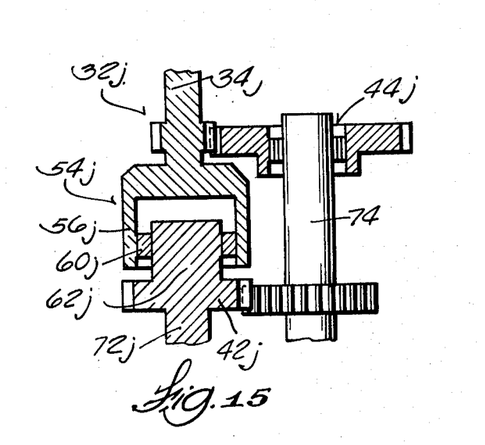

Another alternative embodiment of the transmission is illustrated in FIG. 15, the transmission 32j shown therein having a construction and operation similar to those described in connection with FIG. 11. The basic difference between the transmission shown in FIG. 15 and that shown in FIG. 11 is that in the former the driver 62j and the centrifugal weights 60j of the centrifugal clutch 54j are supported for rotation with the first drive shaft 72 and the second driven gear 42j, and the drum 56j of the centrifugal clutch 54j is carried by the input shaft 34j for rotation therewith.

Figure 16:
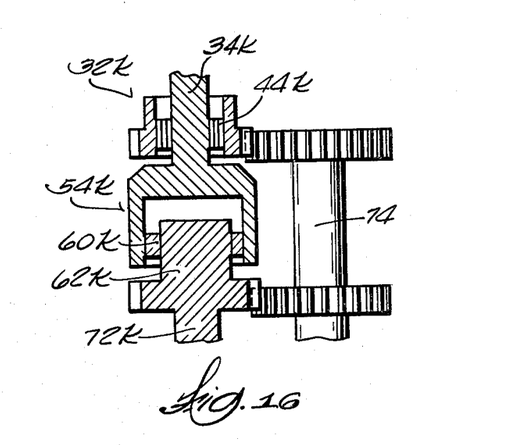

A further alternative embodiment of the transmission is shown in FIG. 16. The transmission 32k illustrated therein has a construction and operation similar to those described in combination with FIG. 12, but the driver and the centrifugal weights of the centrifugal clutch 54k are supported for rotation with the first drive shaft 72 and the drum of the centrifugal clutch is integrally attached to the input shaft 34k for rotation therewith.

Figure 17:
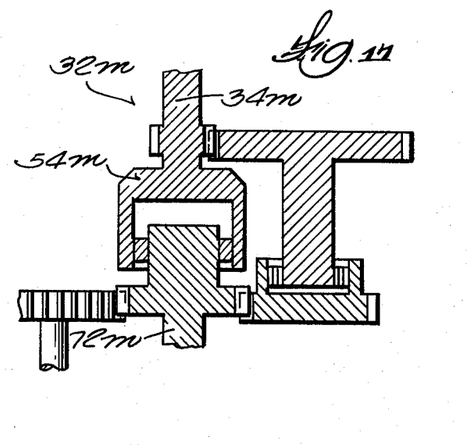

An additional alternative embodiment of a transmission embodying the invention is shown in FIG. 17. The transmission 32m shown therein has a construction and operation similar to that shown in FIG. 13, except that the driver and the centrifugal weights of the centrifugal clutch 54m are supported for rotation with the first drive shaft 72m, and the drum 56m of the centrifugal clutch rotates with the input shaft 34m.

Figure 18:
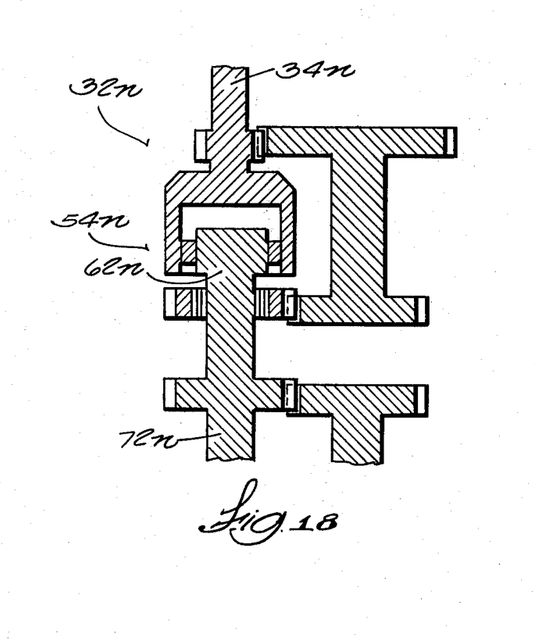

A further alternative embodiment of a transmission embodying the invention is shown in FIG. 18. The transmission 32n shown therein is similar in construction and operation with the transmission 32h shown in FIG. 14, but the driver 62n of the centrifugal clutch 54n is supported for rotation with the first drive shaft 72n and the drum of the centrifugal clutch is integrally attached to the input shaft 34n.

Various features of the invention are set forth in the following claims.

What is claimed is:

1. A marine propulsion device comprising an input shaft drivingly connected to a power source, a lower unit having a rotatably mounted drive shaft extending in coaxial relation to said input shaft, a rotatably mounted propeller shaft carrying a propeller, and means drivingly connecting said drive shaft to said propeller shaft, and a two-speed transmission drivingly connecting said input shaft to said drive shaft, said transmission being shiftable between speed ratios solely in response to variation in the speed of said input shaft and including a first drive means between said input shaft and said drive shaft for selectively drivingly connecting said input shaft and said drive shaft and including a third shaft rotatably mounted in parallel relation to said input shaft and said drive shaft, a first drive gear mounted on said input shaft, a first driven gear mounted on said third shaft and in meshing engagement with said first drive gear, a second drive gear mounted on said third shaft, a second driven gear mounted on said drive shaft and in meshing engagement with said second drive gear, and a one-way overrunning clutch drivingly connecting one of said shafts to a gear mounted on said one shaft when the rotational speed of said input shaft is less than a predetermined value, said first drive means having a first input-output speed ratio with a first value, said first drive means further including means fixedly connecting three of said first drive gear to said input shaft, said third shaft to said first driven gear, said third shaft to said second drive gear, and said second driven gear to said drive shaft, and said one-way overrunning clutch connecting the other of said first drive gear to said input shaft, said first driven gear to said third shaft, said third shaft to said second drive gear, and said second driven gear to said drive shaft, and second drive means for selectively drivingly connecting said input shaft and said drive shaft when the rotational speed of said input shaft is greater than said predetermined value, said second drive means including a selectively actuatable clutch for drivingly connecting said input shaft and said drive shaft and having a second input-output speed ratio with a second value greater than said first value.

2. A marine propulsion device as set forth in claim 1 wherein said transmission is housed in said lower unit.

3. A marine propulsion device as set forth in claim 1 wherein said selectively actuatable clutch is a centrifugal clutch including a drum connected to one of said input shaft and said drive shaft for common rotation therewith, a driver connected to the other of said input shaft and said drive shaft for common rotation therewith, and at least one clutch shoe moveably mounted on said driver for movement into engagement with said drum.

4. A marine propulsion device as set forth in claim 1 wherein said first drive means further includes means fixedly connecting one of said first drive gear to said input shaft and said first driven gear to said third shaft, said one-way overrunning clutch connecting the other of said first drive gear to said input shaft and said first driven gear to said third shaft, means fixedly connecting said second drive gear to said third shaft, and means fixedly connecting said second driven gear to said drive shaft.

5. A marine propulsion device as set forth in claim 4 wherein said first drive gear is fixedly connected to said input shaft and said one-way overrunning clutch connects said first driven gear to said third shaft.

6. A marine propulsion device as set forth in claim 5 wherein said selectively actuatable clutch is a centrifugal clutch including a drum connected to said drive shaft for common rotation therewith, a driver connected to said input shaft for common rotation therewith, and at least one clutch shoe moveably mounted on said driver for movement into engagement with said drum.

7. A marine propulsion device as set forth in claim 5 wherein said selectively actuatable clutch is a centrifugal clutch including a drum connected to said input shaft for common rotation therewith, a driver connected to said drive shaft for common rotation therewith, and at least one clutch shoe moveably mounted on said driver for movement into engagement with said drum.

8. A marine propulsion device as set forth in claim 4 wherein said first driven gear is fixedly connected to said third shaft and said one-way overrunning clutch connects said first drive gear to said input shaft.

9. A marine propulsion device as set forth in claim 8 wherein said selectively actuatable clutch is a centrifugal clutch including a drum connected to said drive shaft for common rotation therewith, a driver connected to said input shaft for common rotation therewith, and at least one clutch shoe moveably mounted on said driver for movement into engagement with said drum.

10. A marine propulsion device as set forth in claim 8 wherein said selectively actuatable clutch is a centrifugal clutch including a drum connected to said input shaft for common rotation therewith, a driver connected to said drive shaft for common rotation therewith, and at least one clutch shoe moveably mounted on said driver for movement into engagement with said drum.

11. A marine propulsion device as set forth in claim 1 wherein said first drive means further includes means fixedly connecting said first drive gear to said input shaft and said first driven gear to said third shaft, means fixedly connecting one of said second driven gear to said drive shaft and said second drive gear to said third shaft, and said one-way overrunning clutch connecting the other of said second driven gear to said drive shaft and said second drive gear to said third shaft.

12. A marine propulsion device as set forth in claim 11 wherein said second driven gear is fixedly connected to said drive shaft and wherein said one-way overrunning clutch connects said second drive gear to said third shaft.

13. A marine propulsion device as set forth in claim 12 wherein said selectively actuatable clutch is a centrifugal clutch including a drum connected to said drive shaft for common rotation therewith, a driver connected to input shaft for common rotation therewith and at least one clutch shoe moveably mounted on said driver for movement into engagement with said drum.

14. A marine propulsion device as set forth in claim 12 wherein said selectively actuatable clutch is a centrifugal clutch including a drum connected to said input shaft for common rotation therewith, a driver connected to said drive shaft for common rotation therewith, and at least one clutch shoe moveably mounted on said driver for movement into engagement with said drum.

15. A marine propulsion device as set forth in claim 11 wherein said second drive gear is fixedly connected to said third shaft and wherein said one-way overrunning clutch connects said second driven gear to said drive shaft.

16. A marine propulsion device as set forth in claim 15 wherein said selectively actuatable clutch is a centrifugal clutch including a drum connected to said drive shaft for common rotation therewith, a driver connected to said input shaft for common rotation therewith, and at least one clutch shoe moveably mounted on said driver for movement into engagement with said drum.

17. A marine propulsion device as set forth in claim 15 wherein said selectively actuatable clutch is a centrifugal clutch including a drum connected to said input shaft for common rotation therewith, a driver connected to said drive shaft for common rotation therewith, and at least one clutch shoe moveably mounted on said driver for movement into engagement with said drum.

18. A marine propulsion device comprising a rotatably mounted input shaft drivingly connected to a power source, a lower unit having a rotatably mounted drive shaft extending in coaxial relation to said input shaft, a propeller shaft rotatably mounted in said lower unit and carrying a propeller, and means drivingly connecting said drive shaft to said propeller shaft, and a two-speed transmission drivingly connecting said input shaft to said drive shaft, said two-speed transmission being shiftable between first and second speed ratios solely in response to variation in the speed of said input shaft and including a third shaft rotatably mounted in parallel relation to said input shaft and said drive shaft, first drive and driven gears in meshing engagement, second drive and driven gears in meshing engagement, means fixedly connecting three of said first drive gear to said input shaft, said first driven gear to said third shaft, said third shaft to said second drive gear, and said second driven gear to said drive shaft, a one-way overrunning clutch connecting the other of said first drive gear to said input shaft, said first driven gear to said third shaft, said third shaft to said second drive gear, and said second driven gear to said drive shaft, and a clutch for selectively drivingly connecting said input shaft and said drive shaft.

19. A marine propulsion device as set forth in claim 18 wherein said transmission is housed in said lower unit.

20. A marine propulsion device as set forth in claim 18 wherein said selectively actuatable clutch is a centrifugal clutch including a drum connected to one of said input shaft and said drive shaft for common rotation therewith, a driver connected to the other of said input shaft and said drive shaft for common rotation therewith, and at least one clutch shoe moveably mounted on said driver for movement into engagement with said drum.

21. A marine propulsion device comprising a rotatably mounted input shaft drivingly connected to a power source, a lower unit having a rotatably mounted drive shaft extending in coaxial relation to said input shaft, a propeller shaft rotatably mounted in said lower unit and carrying a propeller, and means drivingly connecting said drive shaft to said propeller shaft, and a two-speed transmission drivingly connecting said input shaft to said drive shaft, said two-speed transmission being shiftable between first and second speed ratios solely in response to variation in the speed of said input shaft and including a third shaft rotatably mounted in parallel relation to said input shaft and said drive shaft, first drive and driven gears in meshing engagement, second drive and driven gears in meshing engagement, means fixedly connecting one of said first drive gear to said input shaft and said first driven gear to said third shaft, a one-way overrunning clutch connecting the other of said first drive gear to said input shaft and said first driven gear to said third shaft, means fixedly connecting said second drive gear to said third shaft, means fixedly connecting said second driven gear to said drive shaft, and a clutch for selectively drivingly connecting said input shaft and said drive shaft.

22. A marine propulsion device as set forth in claim 21 wherein said clutch comprises a centrifugal clutch including a drum connected to one of said input shaft and said drive shaft for common rotation therewith, a driver connected to the other of said input shaft and said drive shaft for common rotation therewith, and at least one clutch shoe moveably mounted on said driver for movement into engagement with said drum.

23. A marine propulsion device as set forth in claim 21 wherein said first drive gear is fixedly connected to said input shaft and said one-way overrunning clutch connects said first driven gear to said third shaft.

24. A marine propulsion device as set forth in claim 23 wherein said clutch comprises a centrifugal clutch including a drum connected to said drive shaft for common rotation therewith, a driver connected to said input shaft for common rotation therewith and at least one clutch shoe moveably mounted on said driver for movement into engagement with said drum.

25. A marine propulsion device as set forth in claim 23 wherein said clutch comprises a centrifugal clutch including a drum connected to said input shaft for common rotation therewith, a driver connected to said drive shaft for common rotation therewith and at least one clutch shoe moveably mounted on said driver for movement into engagement with said drum.

26. A marine propulsion device as set forth in claim 21 wherein said first driven gear is fixedly connected to said third shaft and said one-way overrunning clutch connects said first drive gear to said input shaft.

27. A marine propulsion device as set forth in claim 26 wherein said clutch comprises a centrifugal clutch including a drum connected to said drive shaft for common rotation therewith, a driver connected to said input shaft for common rotation therewith and at least one clutch shoe moveably mounted on said driver for movement into engagement with said drum.

28. A marine propulsion device as set forth in claim 26 wherein said clutch comprises a centrifugal clutch including a drum connected to said input shaft for common rotation therewith, a driver connected to said drive shaft for common rotation therewith and at least one clutch shoe moveably mounted on said driver for movement into engagement with said drum.

29. A marine propulsion device comprising a rotatably mounted input shaft drivingly connected to a power source, a lower unit having a rotatably mounted drive shaft extending in coaxial relation to said input shaft, a propeller shaft rotatably mounted in said lower unit and carrying a propeller, and means drivingly connecting said drive shaft to said propeller shaft, and a two-speed transmission drivingly connecting said input shaft to said drive shaft, said two-speed transmission being shiftable between first and second speed ratios solely in response to variation in the speed of said input shaft and including a third shaft rotatably mounted in parallel relation to said input shaft and said drive shaft, first drive and driven gears in meshing engagement, second drive and driven gears in meshing engagement, means fixedly connecting said first drive gear to said input shaft and said first driven gear to said third shaft, means fixedly connecting one of said second driven gear to said drive shaft and said second drive gear to said third shaft, a one-way overrunning clutch connecting the other of said second driven gear to said drive shaft, and said second drive gear to said third shaft, and a clutch for selectively drivingly connecting said input shaft and said drive shaft.

30. A marine propulsion device as set forth in claim 29 wherein said transmission is housed in said lower unit.

31. A marine propulsion device as set forth in claim 29 wherein said clutch comprises a centrifugal clutch including a drum connected to one of said input shaft and said drive shaft for common rotation therewith, a driver connected to the other of said input shaft and said drive shaft for common rotation therewith, and at least one clutch shoe moveably mounted on said driver for movement into engagement with said drum.

32. A marine propulsion device as set forth in claim 29 wherein said second driven gear is fixedly connected to said drive shaft and said one-way overrunning clutch connects said second drive gear to said third shaft.

33. A marine propulsion device as set forth in claim 32 wherein said clutch comprises a centrifugal clutch including a drum connected to said drive shaft for common rotation therewith, a driver connected to said input shaft for common rotation therewith and at least one clutch shoe moveably mounted on said driver for movement into engagement with said drum.

34. A marine propulsion device as set forth in claim 32 wherein said clutch comprises a centrifugal clutch including a drum connected to said input shaft for common rotation therewith, a driver connected to said drive shaft for common rotation therewith and at least one clutch shoe moveably mounted on said driver for movement into engagement with said drum.

35. A marine propulsion device as set forth in claim 29 wherein said second drive gear is fixedly connected to said third shaft and said one-way overrunning clutch connects said second driven gear to said drive shaft.

36. A marine propulsion device as set forth in claim 35 wherein said clutch comprises a centrifugal clutch including a drum connected to said drive shaft for common rotation therewith, a driver connected to said input shaft for common rotation therewith and at least one clutch shoe moveably mounted on said driver for movement into engagement with said drum.

37. A marine propulsion device as set forth in claim 35 wherein said clutch comprises a centrifugal clutch including a drum connected to said input shaft for common rotation therewith, a driver connected to said drive shaft for common rotation therewith and at least one clutch shoe moveably mounted on said driver for movement into engagement with said drum.

38. A marine propulsion device comprising a rotatably mounted input shaft drivingly connected to a power source, a lower unit having a rotatably mounted first drive shaft extending in coaxial relation to said input shaft and a second drive shaft rotatably mounted in parallel relation to said input shaft and said drive shaft, a propeller shaft rotatably mounted in said lower unit and carrying a propeller, and means drivingly connecting said first and second drive shafts to said propeller shaft, and a two-speed transmission drivingly connecting said input shaft to said drive shafts, said two-speed transmission being shiftable between first and second speed ratios solely in response to variation in the speed of said input shaft and including first drive and driven gears in meshing engagement, second drive and driven gears in meshing engagement, means fixedly connecting one of said first drive gear to said input shaft and said first driven gear to said second drive shaft, a one-way overrunning clutch connecting the other of said first drive gear to said input shaft and said first driven gear to said second drive shaft, means fixedly connecting said second drive gear to said second drive shaft, means fixedly connecting said second driven gear to said first drive shaft, and a clutch for selectively drivingly connecting said input shaft and said first drive shaft.

39. A marine propulsion device as set forth in claim 38 wherein said transmission is housed in said lower unit.

40. A marine propulsion device as set forth in claim 38 wherein said clutch comprises a centrifugal clutch including a drum connected to one of said input shaft and said first drive shaft for common rotation therewith, a driver connected to the other of said input shaft and said first drive shaft for common rotation therewith, and at least one clutch shoe moveably mounted on said driver for movement into engagement with said drum.

41. A marine propulsion device as set forth in claim 38 wherein said first drive gear is fixedly connected to said input shaft and said one-way overrunning clutch connects said first driven gear to said second drive shaft.

42. A marine propulsion device as set forth in claim 41 wherein said clutch comprises a centrifugal clutch including a drum connected to said first drive shaft for common rotation therewith, a driver connected to said input shaft for common rotation therewith and at least one clutch shoe moveably mounted on said driver for movement into engagement with said drum.

43. A marine propulsion device as set forth in claim 41 wherein said clutch comprises a centrifugal clutch including a drum connected to said input shaft for common rotation therewith, a driver connected to said first drive shaft for common rotation therewith and at least one clutch shoe moveably mounted on said driver for movement into engagement with said drum.

44. A marine propulsion device as set forth in claim 38 wherein said first driven gear is fixedly connected to said second drive shaft and said one-way overrunning clutch connects said first drive gear to said input shaft.

45. A marine propulsion device as set forth in claim 44 wherein said clutch comprises a centrifugal clutch including a drum connected to said first drive shaft for common rotation therewith, a driver connected to said input shaft for common rotation therewith and at least one clutch shoe moveably mounted on said driver for movement into engagement with said drum.

46. A marine propulsion device as set forth in claim 44 wherein said clutch comprises a centrifugal clutch including a drum connected to said input shaft for common rotation therewith, a driver connected to said first drive shaft for common rotation therewith and at least one clutch shoe moveably mounted on said driver for movement into engagement with said drum.

47. A marine propulsion device comprising a rotatably mounted input shaft drivingly connected to a power source, a lower unit having a first rotatably mounted drive shaft extending in coaxial relation to said input shaft and a second rotatably mounted drive shaft parallel to said first drive shaft, a propeller shaft rotatably mounted in said lower unit and carrying a propeller, and means drivingly connecting said first and second drive shafts to said propeller shaft, and a two-speed transmission drivingly connecting said input shaft to said first and second drive shafts, said two-speed transmission being shiftable between first and second speed ratios solely in response to variation in the speed of said input shaft and including a third shaft rotatably mounted in parallel relation to said input shaft, first drive and driven gears in meshing engagement, second drive and driven gears in meshing engagement, a third gear fixed for rotation with said second drive shaft and disposed in enmeshing engagement with said second driven gear, means fixedly connecting three of said first drive gear to said input shaft, said first driven gear to said third shaft, said second driven gear to said first drive shaft, and said second drive gear to said third shaft, a one-way overrunning clutch connecting the other of said first drive gear to said input shaft, said first driven gear to said third shaft, said second drive gear to said third shaft, and said second driven gear to said first drive shaft, and a clutch for selectively drivingly connecting said input shaft and said first drive shaft.

48. A marine propulsion device as set forth in claim 47 wherein said transmission is housed in said lower unit.

49. A marine propulsion device as set forth in claim 47 wherein said clutch comprises a centrifugal clutch including a drum connected to one of said input shaft and said first drive shaft for common rotation therewith, a driver connected to the other of said input shaft and said first drive shaft for common rotation therewith, and at least one clutch shoe moveably mounted on said driver for movement into engagement with said drum.

50. A marine propulsion device as set forth in claim 47 wherein said second driven gear is fixedly connected to said first drive shaft, and said one-way overrunning clutch connects said second drive gear to said third shaft.

51. A marine propulsion device as set forth in claim 50 wherein said clutch comprises a centrifugal clutch including a drum connected to said first drive shaft for common rotation therewith, a driver connected to said input shaft for common rotation therewith, and at least one clutch shoe moveably mounted on said driver for movement into engagement with said drum.

52. A marine propulsion device as set forth in claim 50 wherein said clutch comprises a centrifugal clutch including a drum connected to said input shaft for common rotation therewith, a driver connected to said first drive shaft for common rotation therewith, and at least one clutch shoe moveably mounted on said driver for movement into engagement with said drum.

53. A marine propulsion device comprising a rotatably mounted input shaft drivingly connected to a power source, a lower unit having a first rotatably mounted drive shaft extending in coaxial relation to said input shaft, and a second rotatably mounted drive shaft parallel to said first drive shaft, a propeller shaft rotatably mounted in said lower unit and carrying a propeller, and means drivingly connecting said first and second drive shafts to said propeller shaft, and a two-speed transmission drivingly connecting said input shaft to said first and second drive shafts, said two-speed transmission being shiftable between first and second speed ratios solely in response to variation in the speed of said input shaft and including a third shaft mounted in parallel relation to said input shaft, first drive and driven gears in meshing engagement, second drive and driven gears in meshing engagement, means fixedly connecting said first drive gear to said input shaft and said first driven gear to said third shaft, means fixedly connecting said second drive gear to said third shaft, a one-way overrunning clutch connecting said second driven gear to said first drive shaft, a clutch for selectively drivingly connecting said input shaft and said first drive shaft, third drive and driven gears in meshing engagement, and means fixedly connecting said third drive gear to said first drive shaft and said third driven gear to second drive shaft.

54. A marine propulsion device as set forth in claim 53 wherein said clutch comprises a centrifugal clutch including a drum connected to said first drive shaft for common rotation therewith, a driver connected to said input shaft for common rotation therewith, and at least one clutch shoe moveably mounted on said driver for movement into engagement with said drum.

55. A marine propulsion device as set forth in claim 53 wherein said clutch comprises a centrifugal clutch including a drum connected to said input shaft for common rotation therewith, a driver connected to said first drive shaft for common rotation therewith, and at least one clutch shoe moveably mounted on said driver for movement into engagement with said drum.

* * * * *